United States Patent Office 3,105,827
Patented Oct. 1, 1963

3,105,827
EXTRUDABLE BLEND OF FLUORINATED POLYMER COMPOSITIONS AND WIRE COATED THEREWITH
Herman S. Kaufman, Teaneck, N.J., assignor to Minnesota Mining and Manufacturing Company, St. Paul, Minn., a corporation of Delaware
No Drawing. Filed Oct. 2, 1958, Ser. No. 764,750
8 Claims. (Cl. 260—45.5)

This invention relates to blends of perfluorohaloolefin polymers. In a more particular aspect this invention relates to three component blends of perfluorohaloolefin polymers.

Because of their unusual chemical and physical characteristics, thermoplastic perfluorohaloolefin polymers are widely used in applications where environmental conditions are adverse. Among the most outstanding of the properties of thermoplastic perfluorohaloolefin polymers, such as polymers of trifluorochloroethylene, is chemical inertness. Thus, these polymers may be exposed to a wide variety of oxidizing, reducing and solvent-type reagents, such as fuming nitric acid, hydrazine, hydrogen peroxide and aniline with no apparent effect on the polymer. In addition to their high degree of chemical stability, these polymers possess high thermal stability, excellent electrical properties and are readily molded and extruded into various useful items.

Homopolymers of the perfluorochloroolefins, such as the homopolymer of trifluorochloroethylene, have found wide use in applications where chemical inertness is important. However, homopolymers of the perfluorochloroolefins are somewhat susceptible to heat embrittlement when the polymer is maintained at high temperatures for prolonged periods of time. Heat aging of the homopolymers also may result in a loss of flexibility. The heat embrittlement characteristics of the homopolymer have been improved somewhat by the development of a copolymer which contains a relatively small amount of a halogenated hydrogen-containing olefin comonomer. The presence of the halogenated hydrogen-containing olefin comonomer apparently upsets the symmetry of the molecule, thus decreasing crystallinity of the solid product without substantially altering other physical properties. These copolymers have found wide-spread use as wire insulation material and in other applications where thermal stress is anticipated. Despite their good physical characteristics, there is still a need to improve the properties of these perfluorochloroolefin polymers, particularly for use in critical high temperature applications, such as in wire insulation, and for extrusion onto electrical wire.

It is an object of this invention to provide a composition containing perfluorohaloolefin polymers which has high impact strength and resists thermal embrittlement.

It is a further object of this invention to provide a composition of perfluorohaloolefin polymers which resists the tendency toward crystallization at elevated temperatures.

It is still another object of this invention to provide a composition of perfluorochloroolefin copolymers which has outstanding extrusion properties.

Various other objects and advantages of the present invention will become apparent to those skilled in the art from the accompanying description and disclosure.

In general, the above objects are accomplished by forming a composition by admixing (I) a thermoplastic perfluorohaloolefin polymer (II) a resinous trifluorochloroethylene copolymer containing between about 69 and about 80 mole percent of trifluorochloroethylene and as essentially the sole remaining monomer, a halogenated hydrogen-containing olefin comonomer, and (III) an elastomeric copolymer of vinylidene fluoride and a member of the group consisting of trifluorochloroethylene and perfluoropropene.

The thermoplastic trifluorochloroethylene polymer (I) contains more than 90 mole percent and as much as 100 mole percent of trifluorochloroethylene. The remaining constituent, the halogenated hydrogen-containing olefin, is preferably a hydrogen and fluorine containing ethylene, such as vinylidene fluoride, vinyl fluoride, 1,2-difluoroethylene, 1,1,2 trifluoroethylene and 1,1-fluorochloroethylene. Vinylidene fluoride is the most preferable halogenated hydrogen-containing ethylene. Such polymers and methods for their preparation are well known in the art and are described in U.S. 2,738,343.

The resinous trifluorochloroethylene copolymers (II) are non-elastomeric in nature and contain between about 69 and about 80 mole percent of trifluorochloroethylene and, as essentially the sole remaining comonomer, a fluoroethylene, such as vinylidene fluoride. Polymers of this type, as well as methods for their manufacture, are also known in the art, as disclosed in U.S. 2,752,332.

The elastomeric copolymers (III) are non-resinous in nature and contain vinylidene fluoride and a monomer selected from the group consisting of trifluorochloroethylene and perfluoropropene. Elastomeric copolymers of trifluorochloroethylene and vinylidene fluoride contain between about 20 and about 69 mole percent, preferably between about 25 and about 50 mole percent of trifluorochloroethylene. A detailed description of trifluorochloroethylene-vinylidene fluoride elastomers and methods for their manufacture appears in U.S. 2,752,331. Elastomeric copolymers of perfluoropropene and vinylidene fluoride contain between about 6 and about 60 mol percent of perfluoropropene, preferably between about 15 and about 60 mol percent of perfluoropropene, the copolymers falling within the preferred range being completely amorphous and having a low torsional modulus and high retention of rubbery properties over a wide range of temperatures, i.e. between about —30° F. and about 600° F. without embrittlement, degradation or hardening.

The elastomeric copolymers of perfluoropropene and vinylidene fluoride are prepared by employing an initial monomer charge containing between about 10 and about 80 mole percent of perfluoropropene, preferably between 20 and about 80 mole percent, and polymerizing in the presence of a polymerization promoter, preferably in an aqueous emulsion polymerization system. The polymerization may be carried out under autogenous pressures as a matter of convenience and at a temperature between about 0° C. and about 100° C., usually between about 25° C. and about 75° C. when the aqueous emulsion polymerization system is used. Among the polymerization promoters which may be used are the organic peroxides, such as cumene hydroperoxide, diisopropyl benzene hydroperoxide, methyl cyclohexane hydroperoxide, etc., and water soluble inorganic peroxides, such as barium peroxide, zinc peroxide, sodium perphosphate, potassium persulfate, etc. Other free radical forming or ionic type promoters may also be employed. When the aqueous emulsion system is used emulsifiers are usually present, including perfluorochloroalkanoic acids and salts with from 6 to 14 carbon atoms per molecule. Reductants or activators, such as sodium bisulfite, and accelerators, such as cuprous sulfate, ferrous sulfate, silver nitrate and other water soluble variable valence metal salts, may also optionally be included in the polymerization system.

The following example illustrates the preparation of these elastomeric perfluoropropene-vinylidene fluoride copolymers. A 300 ml. aminco polymerization bomb was charged with the following emulsion polymerization catalyst system, freezing the contents of the bomb after the addition of each ingredient:

(1) 15 ml. of water containing 3 grams of dissolved disodium hydrogen phosphate heptahydrate,
(2) 90 ml. of water containing 0.75 gram of dissolved perfluorooctanoic acid, and
(3) 45 ml. of water containing 0.75 gram of dissolved potassium persulfate.

The pH of the entire polymerization catalyst system was found to be about 7. The bomb was then connected to a gas transfer system and evacuated at liquid nitrogen temperature. The polymerization bomb was then charged with 36.6 grams of hexafluoropropene and 23.4 grams of vinylidene fluoride corresponding to a total monomer charge containing 40 mol percent of hexafluoropropene and 60 mol percent of vinylidene fluoride. The polymerization bomb was then closed and placed in a mechanical shaker. The polymerization reaction was conducted at a temperature of 50° C. for a total period of 18 hours under autogenous pressure. At the end of the polymerization reaction the bomb was vented to atmospheric pressure thereby also removing any unreacted monomers. The polymer latex was then coagulated by freezing the contents of the bomb at liquid nitrogen temperature. The coagulated product was collected, thoroughly washed with hot water and dried in vacuo at a temperature of 35° C. The product was a snappy, white rubber having a torsional modulus of 122 pounds per square inch, and was obtained in a 68 percent conversion. Analysis for fluorine content showed the product to contain 67.7 percent fluorine corresponding to about 29.5 mol percent of combined hexafluoropropene and about 70.5 mol percent of combined vinylidene fluoride. Latices of the other polymers of this invention can be similarly prepared.

In the preparation of the novel polymer blends of this invention, the admixing of the polymers may be accomplished by both wet and dry methods. It has been discovered, however, that superior blends for most applications, particularly for wire coating applications, are produced by blending the aqueous latices of the respective polymers, produced by polymerizing the monomers in an aqueous emulsion or suspension type system, and then coagulating and separating the polymer particles. By using the latex blending technique the particle size is considerably smaller, i.e. less than 1 micron, than is otherwise obtainable by the more conventional dry blending and grinding procedures. After blending the aqueous latices the polymers may be coagulated by freezing or by addition of coagulating agents, such as ionic salts, and the coagulate separated by decanting, centrifugation, filtration, etc.

In order to display the aforementioned outstanding properties for such molding operations as injection, compression, extrusion or transfer molding, it has been discovered that the various polymers (I, II and III) are most preferably present within certain defined concentration ranges. Thus, polymer I comprises from about 75 to about 95 weight percent of total polymer, preferably between about 85 and about 95 weight percent. Polymer II comprises between about 3 and about 15 weight percent of total polymer, preferably between about 5 and about 10 weight percent. Polymer III comprises between about 1 and about 15 weight percent of total polymer, preferably between about 1 and about 10 weight percent. When extruded, for example onto electrical hookup wire, the above compositions extrude easily and smoothly and produce a wire coating which retains the inherent advantages of the high molecular weight fluorinated polymers and additionally much improved high temperature aging properties, as is illustrated by the actual test data hereinafter disclosed. The presence of polymer II and polymer III also minimizes the deleterious effects of crystallization, e.g. cracking and deterioration of the molded article, by maintaining amorphous regions in the polymer system to prevent undue strains and stresses in the finished product. The resulting polymer article or coating thus simultaneously displays high impact strength while resisting thermal embrittlement.

Using a 1½" Davis-Standard extruded (26/1 L/D, 1.8/1 compression ratio metering type screw) to which was fed 7/30 American wire gauge 22 silver plated copper-conductor and a polymer blend of the composition set forth in Table I, prepared by admixing latices of the respective polymers, coagulating and drying, a series of prolonged runs were made to produce an insulation with a high zero strength time (ASTM D1430–56T), low strain and excellent high temperature aging properties.

*Table 1*

|  | Wt. percent |
|---|---|
| (I) 96 mol percent trifluorochloroethylene–4 mol percent vinylidene fluoride copolymer | 90 |
| (II) 75 mol percent trifluorochloroethylene–25 mol percent vinylidene fluoride copolymer | 7 |
| (III) 50 mol percent trifluorochloroethylene–50 mol percent vinylidene fluoride copolymer | 3 |
|  | 100 |

The above composition was extruded onto the wire at a rate sufficient to produce a final insulation thickness of 10 mils, the extrusion temperature in the die body being maintained in the 560–580° F. range. The extrusion or wire speed was adjusted to 225 feet per minute. After the extrudate had drawn down onto the wire, the wire was quenched in a water bath.

Aging tests indicated that the coated wire produced in displayed outstandingly excellent aging properties, such aging tests including runs at 150° C., 175° C., and 190° C. for periods of 4 and 7 days. The heat aging tests were conducted as follows.

Wire samples were placed in ovens and maintained at the desired temperature for a given period of time. Periodically a short length was removed, cooled, wrapped in six close turns on a mandrel whose diameter was twice the overall wire diameter, immersed in tap water for one hour at 25° C. and subjected to a voltage test as a means of detecting insulation breakdown not evident to the eye. The A.C. voltage was applied at the rate of 500 v./sec. until a value of 2000 volts was reached, at which voltage it was held for one minute; then the voltage was raised at 500 v./sec. until failure or until 15 kilovolts was reached. The following results were obtained.

*Table 2*

| | |
|---|---|
| Extrusion speed ft./min. | 225 |
| Voltage breakdown, initial kv | 13 |
| Voltage breakdown, after 4 days @ 150° C. kv | 13 |
| Voltage breakdown, after 4 days @ 175° C. kv | 12 |
| Voltage breakdown, after 4 days @ 190° C. kv | 15+ |
| Voltage breakdown, after 7 days @ 150° C. kv | 11 |
| Voltage breakdown, after 7 days @ 175° C. kv | 14 |
| Voltage breakdown, after 7 days @ 190° C. kv | 14 |

These results are well in excess of the 2 kv. voltage considered to be acceptable and are a marked improvement over other extrusion compositions containing trifluorochloroethylene polymer. The above wire coating displayed exception resistance to aging and heat shock even at temperatures of 190° C. for extended periods of time. Shrinkage was low, and cold bend results, before and after aging at 150° C., is excellent. Most wire coating compositions, in comparison, will not withstand aging for 4 hours at 190° C. without flowing, charring or becoming brittle. It was also noted that the extrusion speed was at least 50 percent higher than that obtainable when using polymer I without polymers II and III.

When additional runs were made under similar conditions, using the composition of Table 1, at a wire speed of 195 ft./min., the following test results were obtained.

Table 3

| | |
|---|---|
| Extrusion speed_____ft./min__ | 195 |
| Voltage breakdown, initial_____kv__ | 13 |
| Voltage breakdown, after 4 days @ 150° C___kv__ | 13 |
| Voltage breakdown, after 4 days @ 175° C___kv__ | 9 |
| Voltage breakdown, after 4 days @ 190° C___kv__ | 14 |
| Voltage breakdown, after 7 days @ 150° C.___kv__ | 12 |
| Voltage breakdown, after 7 days @ 175° C___kv__ | 13 |
| Voltage breakdown, after 7 days @ 190° C___kv__ | 15+ |

When equivalent runs were made, using perfluoropropenevinylidene fluoride elastomer as polymer III, similar results were obtained.

It is also within the scope of this invention to include fillers, stabilizers and other additives to the polymer blends as described herein, such as silica, asbestos, coloring pigments, etc.

Various modifications and alterations of the polymer compositions of this invention and methods for their preparation will be apparent to those skilled in the art without departing from the scope of this invention.

I claim:

1. An extrudable solid polymer composition which comprises: (1) from about 75 to about 95 weight percent of a thermoplastic trifluorochloroethylene polymer selected from the group consisting of the homopolymer of trifluorochloroethylene and the copolymer of trifluorochloroethylene and, as the remaining constituent, a maximum of about 10 mol percent of a halogenated hydrogen-containing olefin in which the substituents are selected from the group consisting of hydrogen, fluorine and chlorine; (2) from about 3 to about 15 weight percent of a resinous trifluorochloroethylene of between about 69 and about 80 mol percent of trifluorochloroethylene and, as the remaining constituent, vinylidene fluoride; and (3) from about 1 to about 15 weight percent of an elastomeric copolymer of vinylidene fluoride and, as the remaining constituent, a member of the group consisting of trifluorochloroethylene and perfluoropropene, the above weight percent figures being based on the sum of the three aforesaid polymers.

2. An extrudable solid polymer composition which comprises: (1) from about 85 to about 95 weight percent of a thermoplastic trifluorochlorethylene polymer selected from the group consisting of the homopolymer of trifluorochlorethylene and the copolymer of trifluorochloroethylene and, as the remaining constituent, a maximum of about 10 mol percent of a halogenated hydrogen-containing olefin in which the substituents are selected from the group consisting of hydrogen, fluorine and chlorine; (2) from about 5 to about 10 weight percent of a resinous trifluorochlorethylene of between about 69 and about 80 mol percent of trifluorochloroethylene and, as the remaining constituent, vinylidene fluoride; and (3) from about 1 to about 10 weight percent of an elastomeric copolymer of vinylidene fluoride and, as the remaining constituent, a member of the group consisting of trifluorochloroethylene and perfluoropropene, the above weight percent figures being based on the sum of the three aforesaid polymers.

3. An insulated wire coated with the polymer composition of claim 1.

4. An extrudable solid polymer composition which comprises: (1) from about 75 to about 95 weight percent of a thermoplastic trifluorochloroethylene polymer selected from the group consisting of the homopolymer of trifluorochloroethylene and the copolymer of trifluorochloroethylene and, as the remaining constituent, a maximum of about 10 mol percent of vinylidene fluoride; (2) from about 3 to about 15 weight percent of a resinous trifluorochloroethylene of between about 69 and about 80 mol percent of trifluorochloroethylene and, as the remaining constituent, vinylidene fluoride; and (3) from about 1 to about 15 weight percent of an elastomeric copolymer of vinylidene fluoride and, as the remaining constituent, a member of the group consisting of trifluorochloroethylene and perfluoropropene, the above weight percent figures being based on the sum of the three aforesaid polymers.

5. An insulated wire coated with the polymer composition of claim 4.

6. An extrudable solid polymer composition which comprises: (1) from about 85 to about 95 weight percent of a thermoplastic trifluorochloroethylene polymer selected from the group consisting of the homopolymer of trifluorochloroethylene and the copolymer of trifluorochloroethylene and, as the remaining constituent, a maximum of about 10 mol percent of vinylidene fluoride; (2) from about 5 to about 10 weight percent of a resinous trifluorochloroethylene of between about 69 and about 80 mol percent of trifluorochloroethylene and, as the remaining constituent, vinylidene fluoride; and (3) from about 1 to about 10 weight percent of an elastomeric copolymer of vinylidene fluoride and, as the remaining constituent, a member of the group consisting of trifluorochloroethylene and perfluoropropene, the above weight percent figures being based on the sum of the three aforesaid polymers.

7. An extrudable solid polymer composition which comprises: (1) 90 weight percent of a thermoplastic trifluorochloroethylene polymer selected from the group consisting of the homopolymer of trifluorochloroethylene and the copolymer of trifluorochloroethylene and, as the remaining cnstituent, a maximum of about 10 mol percent of vinylidene fluoride; (2) 7 weight percent of a resinous trifluorochloroethylene of between about 69 and about 80 mol percent of trifluorochloroethylene and, as the remaining constituent, vinylidene fluoride; and (3) 3 weight percent of an elastomeric copolymer of vinylidene fluoride and, as the remaining constituent, a member of the group consisting of trifluorochloroethylene and perfluoropropene, the above weight percent figures being based on the sum of the three aforesaid polymers.

8. An insulated wire coated with the polymer composition of claim 7.

References Cited in the file of this patent

UNITED STATES PATENTS

| | | |
|---|---|---|
| 2,752,331 | Dittman et al. | June 26, 1956 |
| 2,789,960 | Smith | Apr. 23, 1957 |
| 2,866,721 | Hetherington | Dec. 30, 1958 |
| 2,944,997 | Gates et al. | July 12, 1960 |